(12) United States Patent
Kofuji

(10) Patent No.: US 7,946,374 B2
(45) Date of Patent: May 24, 2011

(54) VEHICLE

(75) Inventor: Kenji Kofuji, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 164 days.

(21) Appl. No.: 12/393,461

(22) Filed: Feb. 26, 2009

(65) Prior Publication Data

US 2009/0233723 A1    Sep. 17, 2009

(30) Foreign Application Priority Data

Mar. 13, 2008   (JP) ................................. 2008-064837

(51) Int. Cl.
*B62K 11/04* (2006.01)
(52) U.S. Cl. ...................... 180/226; 180/219; 403/359.5
(58) Field of Classification Search .................. 180/226, 180/219; 403/359.5
See application file for complete search history.

(56) References Cited

U.S. PATENT DOCUMENTS

| | | | | |
|---|---|---|---|---|
| 4,523,871 A * | 6/1985 | Recker | ............................ | 403/12 |
| 6,009,609 A * | 1/2000 | Hanno | ......................... | 29/401.1 |
| 6,467,565 B1 * | 10/2002 | Handa et al. | .................. | 180/383 |
| 6,582,151 B2 * | 6/2003 | Hopson | ....................... | 403/359.5 |
| 7,533,751 B2 * | 5/2009 | Handa et al. | .................. | 180/210 |
| 7,644,797 B2 * | 1/2010 | Kofuji | ........................... | 180/227 |
| 7,665,562 B2 * | 2/2010 | Utsumi et al. | ................ | 180/226 |
| 2007/0199756 A1 * | 8/2007 | Kofuji | ........................... | 180/226 |
| 2009/0057046 A1 * | 3/2009 | Kofuji | ........................... | 180/226 |

FOREIGN PATENT DOCUMENTS

JP    6-517 B2    1/1994

* cited by examiner

*Primary Examiner* — Joanne Silbermann
*Assistant Examiner* — Michael R Stabley
(74) *Attorney, Agent, or Firm* — Birch Stewart Kolasch & Birch, LLP

(57) ABSTRACT

A rear wheel drive mechanism acting as a drive force transmission mechanism provided in a vehicle is provided with a spline section provided on an outer periphery of one end of a first drive shaft acting as an output shaft, a spline hole provided on an inner periphery of a tubular engaging section of a universal joint and engaging with the spline section, and a circular clip disposed spanning the inner periphery and the outer periphery. An operating section of the clip faces a notched section provided on the tubular engaging section. The notched section is provided on a tip of the tubular engaging section and opens with respect to an axial dimension of the first drive shaft. The drive mechanism so configured simplifies the operation of mounting or removing a universal joint onto an output shaft of a vehicle.

18 Claims, 6 Drawing Sheets

VEHICLE

CROSS-REFERENCE TO RELATED APPLICATION

The present application claims priority under 35 U.S.C. §119 to Japanese Patent Application No. 2008-064837, filed Mar. 13, 2008, the entire contents of which are hereby incorporated by reference.

BACKGROUND OF THE INVENTION

1. Field of the Invention

The present invention relates to a vehicle transmitting a drive force via a drive shaft and a universal joint.

2. Description of Background Art

A vehicle transmitting a drive force from an engine to drive wheels via a drive shaft and a universal joint is known (for example, refer to JP-B No. H6-517).

As shown in FIG. 3 of JP-B No. H6-517, a Cardan joint 86 is connected to an output shaft 70 outputting a drive force from an engine (the reference numerals hereafter follow those of JP-B No. H6-517 (FIG. 3). A drive shaft 84 is connected to the Cardan joint 86. A gear coupling 88, a reduction pinion 54, a reduction gear 48 and a rear axle 38 are connected in sequence to the drive shaft 84. Rear drive wheels are connected to the rear axle 38 and a drive force from the engine is transmitted to the rear wheels.

The Cardan joint 86 (hereafter "universal joint") is engaged with the rear end of the output shaft 70. The front end of the universal joint 86 is fastened by a fastening member to the rear end of the output shaft 70. In other words, the universal joint 86 is mounted on the output shaft 70 to be incapable of motion in an axial direction.

The technique disclosed in JP-B No. H6-517 requires the removal of the fastening member interposed between the output shaft 70 and the universal joint 86 when mounting or removing the universal joint 86 from the output shaft 70.

However, since the fastening member which fastens the universal joint 86 to the output shaft 70 which rotates at a high speed is fastened with a predetermined tightening torque, the attachment or detachment of the universal joint 86 from the output shaft 70 is considerably complicated by the operation of attaching or detaching the fastening member.

SUMMARY AND OBJECTS OF THE INVENTION

One object of the present invention is providing a technique simplifying the operation of mounting or removing a universal joint onto an output shaft of a vehicle.

According to an embodiment of the invention, a vehicle transmitting drive force from an engine to drive wheels via a universal joint and a drive shaft from an engine to drive wheels. A spline hole provided on an inner periphery of a tubular engaging section of the universal joint is engaged with a spline section provided on an outer periphery on one end of the drive shaft and an operating section for a clip faces a notched section provided on the tubular engaging section.

According to an embodiment of the invention, a vehicle provided with a swing arm provided to swing freely on a vehicle frame via a pivot shaft and drive wheels axially supported by the swing arm and rotated by a drive shaft transmitting drive force from an engine. The drive shaft is connected to the output shaft of the engine by a universal joint. A spline hole provided on an inner periphery of a tubular engaging section of the universal joint is engaged with a spline section provided on an outer periphery of the output shaft. A circular clip is provided spanning the outer periphery and the inner periphery, and an operating section for the clip faces a notched section provided on the tubular engaging section.

According to an embodiment of the invention, a vehicle in which the notched section is provided on a tip end of the tubular engaging section and opens towards the axial dimension of the drive shaft.

Effects of the invention include the following:

According to an embodiment of the invention, since an inner periphery of a universal joint is engaged with an output periphery of a spline section and a circular clip is provided spanning the outer periphery and inner periphery, it is possible to ensure the position of the universal joint with respect to an axial dimensional of the drive shaft.

Furthermore an operating section for the clip is adapted to face the notched section provided on the tubular engaging section. When assembling the universal joint onto the drive shaft, the operating section for the clip is operated, and the universal joint is shifted while the clip is expanded in order to facilitate a mounting operation of the clip onto the drive shaft.

When removing the universal joint from the drive shaft, the operating section of the clip is operated, and the universal joint is shifted while the clip is expanded in order to facilitate a removal operation of the clip from the drive shaft and to facilitate removal of the universal joint from the drive shaft.

According to an embodiment of the invention, an inner periphery of the universal joint is engaged with an outer periphery of the spline section and a circular clip is provided spanning the outer periphery and the inner periphery. Thus it is possible to ensure the position of the universal joint with respect to an axial dimension of the drive shaft.

Furthermore the operating section for the clip is adapted to face the notched section provided on the tubular engaging section. When assembling the universal joint onto the drive shaft, the operating section for the clip is operated, and the universal joint is shifted while the clip is expanded in order to facilitate a mounting operation of the clip onto the drive shaft.

When removing the universal joint from the drive shaft, the operating section of the clip is operated, and the universal joint is shifted while the clip is expanded in order to facilitate a removal operation of the clip from the drive shaft.

According to an embodiment of the invention, the notched section is provided on a tip end of the tubular engaging section and opens towards the axial dimension of the drive shaft. Thus the clip is shifted using the notched section and allows a removal or mounting operation of the clip to be simplified. Since the clip can be simply attached or detached to the drive shaft, the attachment/detachment properties of the clip with respect to the tubular engaging section are greatly enhanced.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
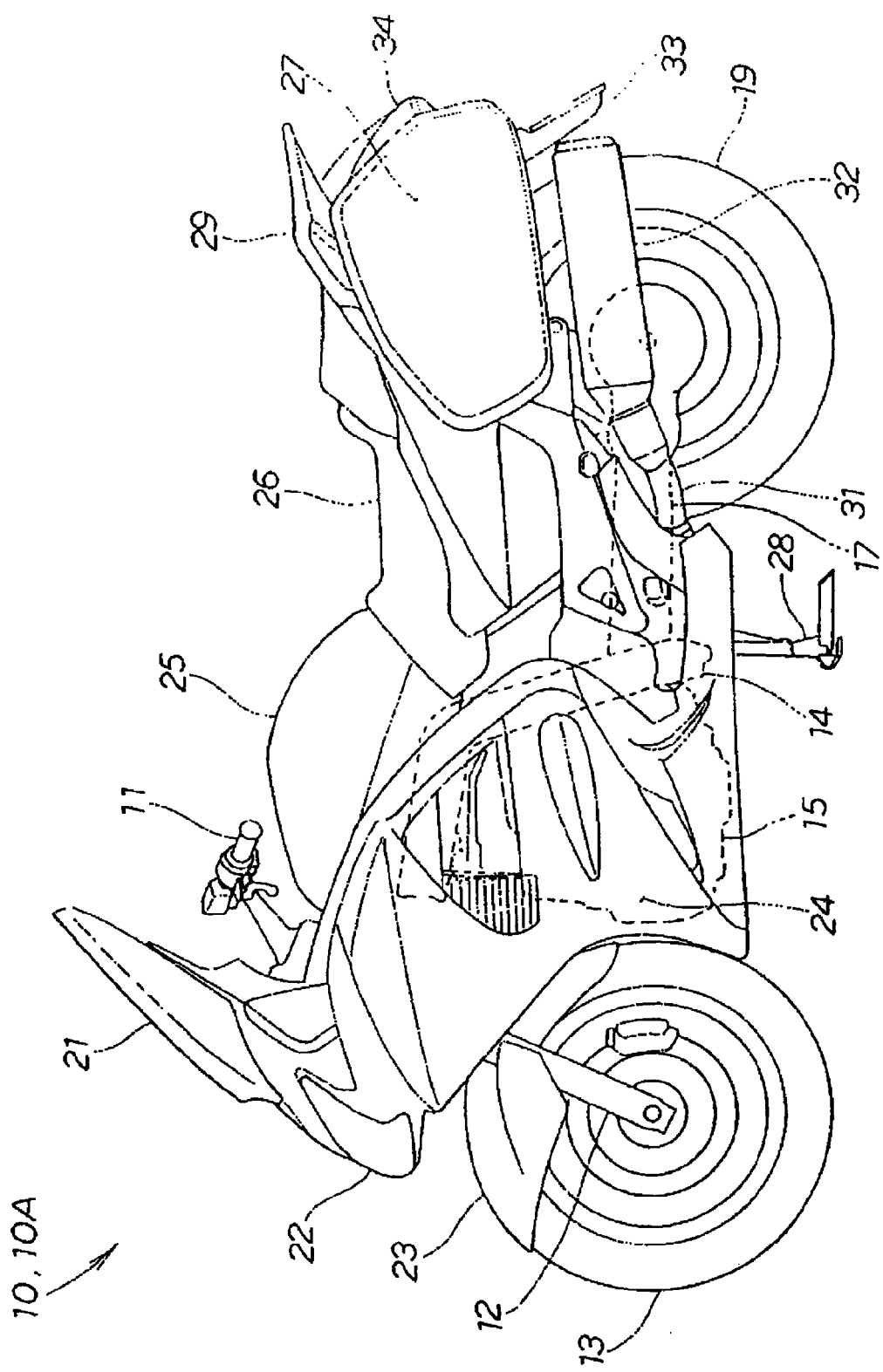
FIG. 1 shows a left view of a vehicle according to the present invention.

FIG. 1 shows a left side view of a vehicle according to the present invention. A motorcycle 10A as an example of a vehicle 10 has a steering handlebar 11, front forks 12 and a front wheel 13 steered by the steering handlebar 11 provided on a front vehicle section. A vehicle frame 14 is disposed along the central vehicle section from the vehicle front section and an engine 15 is mounted on the vehicle frame 14. A swing arm 17 is mounted to swing on a lower section of the vehicle frame 14. A rear wheel 19 is mounted as a vehicle wheel on the rear end section of the swing arm 17.

The output of the engine 15 is transmitted to the rear wheel 19 by a rear wheel drive mechanism housed in the swing arm 17. The rear wheel drive mechanism will be described below.

FIG. 1 also illustrates a window screen 21, a headlight 22, a front fender 23, a cowl 24, a fuel tank 25, a passenger seat 26, a luggage box 27, a main stand 28, a grab rail 29, an exhaust pipe 31, a muffler 32, a rear fender 33, and a tail lamp 34.

Figure 2:
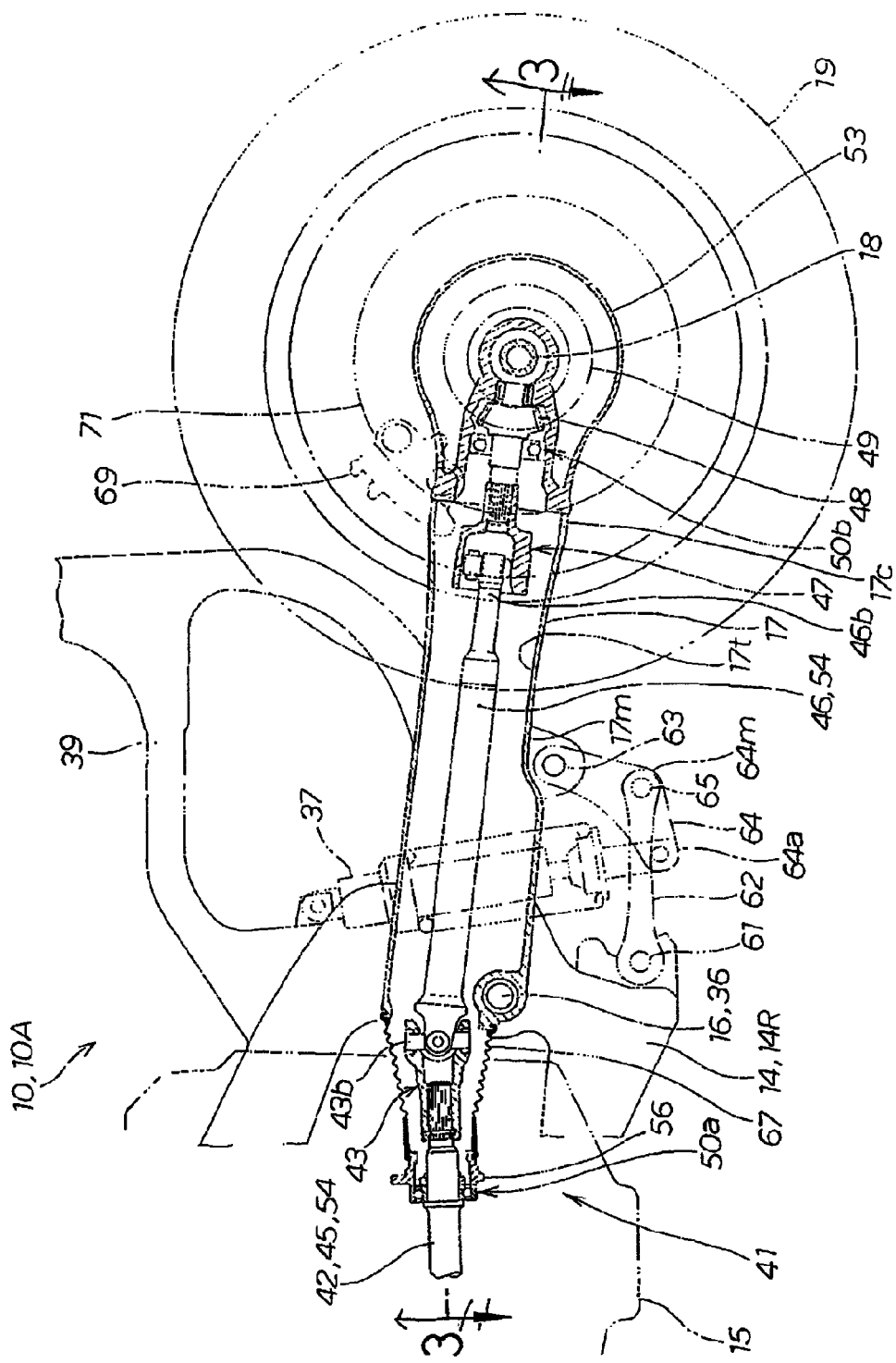
FIG. 2 shows the rear section of a vehicle according to the present invention.

FIG. 2 shows the rear section of a vehicle according to the present invention.

A motorcycle 10A as an example of a vehicle 10 is provided with a vehicle frame 14L, 14R (only 14R is shown in back of the figure), an engine 15 suspended on the vehicle frame 14L, 14R, a pivot shaft 36 acting as a supporting section 16 is provided on a rear section of the vehicle frame 14L, 14R, a swing arm 17 provided to swing freely on the pivot shaft 36, a rear wheel 19 axially supported to rotate via a rear wheel axle 18 on a rear section of the swing arm 17, and a shock absorber 37 interposed between the swing arm 17 and the vehicle frame 14. Reference numeral 39 denotes a sub-frame provided on a rear section of the vehicle frame 14L, 14R and supporting a vehicle rear section including the passenger seat 26.

The main components of the rear wheel drive mechanism 41 are a universal joint 43, a second drive shaft 46, a drive gear 48 and a driven gear 49 and bearings 50a, 50b. The universal joint 43 is connected to a first drive shaft 45 acting as an output shaft 42 from the engine 15 and transmits drive force. The second drive shaft 46 is connected to the rear end 43b of the universal joint 43 and transmits drive force from the engine 15. The drive gear 48 and the driven gear 49 mount a shaft length variation mechanism 47 varying a shaft length of the second drive shaft 46 on the rear end 46b of the second drive shaft 46. The drive gear 48 and the driven gear 49 are connected to the shaft length variation mechanism 47 and vary the direction of drive force that is transmitted to the rear wheel axle 18. The bearings 50a and 50b support the first and second driven shafts 45, 46.

In this embodiment, the shaft length variation mechanism 47 uses a tripod constant velocity joint. However the invention is not limited in this regard and a ball spline slip expansion joint, spanning groove joint or the like may be used. The joint is not limited to the structure as long as the joint has a sliding function.

In other words, when the first drive shaft 45 and the second drive shaft 46 are connected to the front and rear end of the universal joint 43 to form a drive shaft 54, the motorcycle 10A which is an example of a vehicle 10 has a swing arm 17 provided to swing freely via a pivot shaft 36 on the vehicle frame 14 and a rear wheel 19 axially supported on the swing arm 17 and acting as a vehicle drive wheel 20 rotated by the drive shaft 54 transmitting the drive force of the engine 15. The drive force is transmitted through the universal joint 43 and the drive shaft 54 to the rear wheel 19 from the engine 15.

A second shaft 46 is provided in a space 17t formed in an interior section of the swing arm 17.

A first arm member 62, a second arm member 64, a shock absorber 37 and a third swing shaft 65 are provided on the swing arm 17. The first arm member 62 extends and swings from the vehicle frame 14L, 14R (only 14R is shown in the back of the figure) in a rearward direction via a first swing shaft 61. The second arm member 64 extends and swings in a forward downward sloping direction via a second swing shaft 63 from a middle section 17m of the swing arm 17. The shock absorber 37 is interposed between the vehicle frame 14 and the tip 64a of the second arm member 64. The third swing shaft 65 mounts a tip of the first arm member 62 to swing on a middle section 64m of the second arm member 64. These components are adapted to absorb vibration applied to the swing arm 17.

A final gear case 53 housing the rear wheel axle 18 and peripheral drive system components therefor is disposed on the rear end 17c of the swing arm. Reference numeral 56 denotes a bearing holder, 67 is a boot, 69 is a rear disk brake unit and 71 is a rear brake disk.

Figure 3:
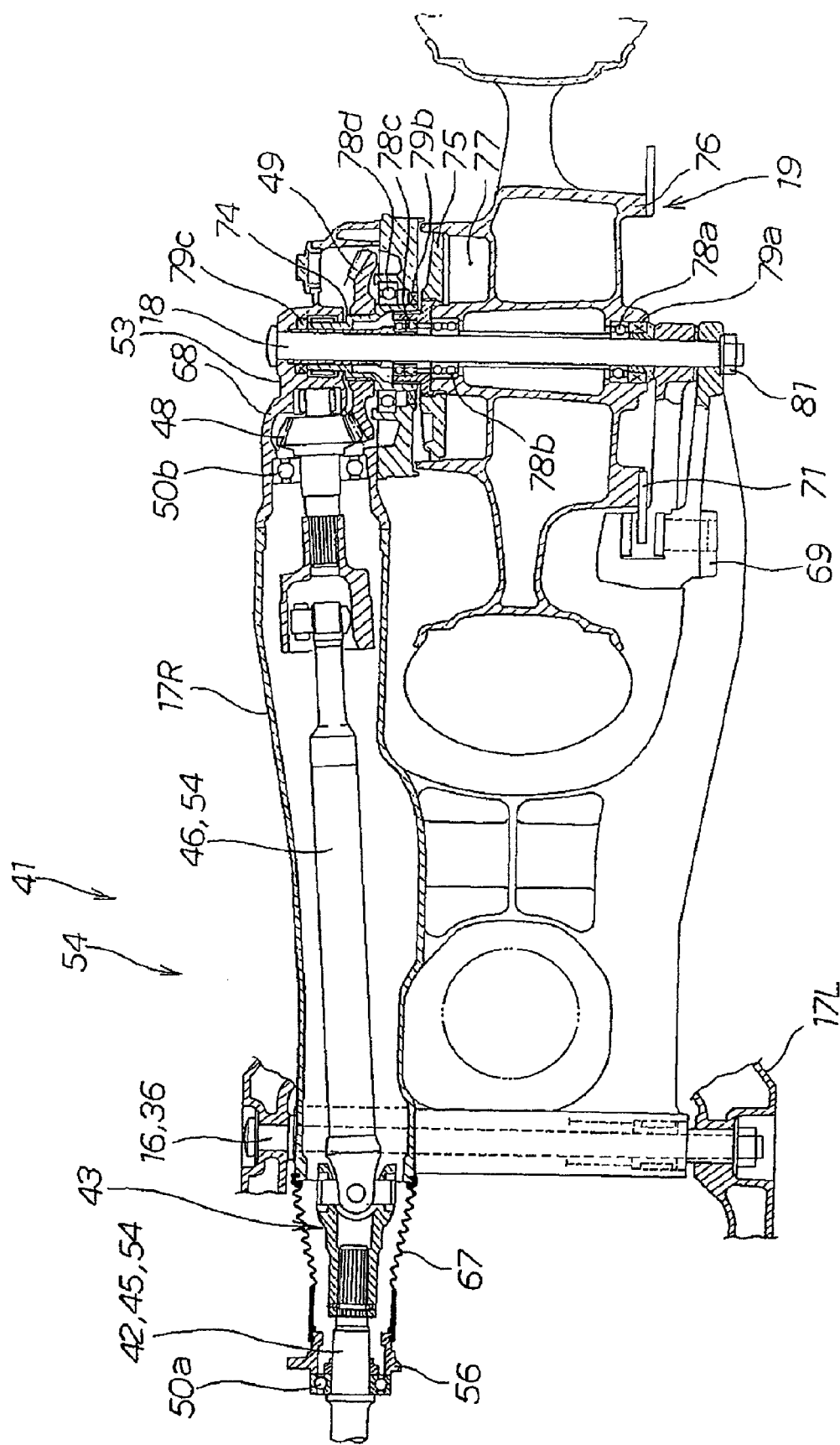
FIG. 3 is a sectional view along the line 3-3 in FIG. 2.

FIG. 3 is a sectional view along the line 3-3 in FIG. 2. The rear wheel drive mechanism 41 provided with a drive shaft 54 is housed in a final gear case 53 provided on the right swing arm 17R and the side on which the right swing arm 17R is provided.

The main components of the rear wheel shaft peripheral mechanism are a sleeve 74, a damper holder 75 and a damper member 77. The sleeve 74 supports a driven gear 49 and is provided to rotate freely about the rear wheel axle 18. The damper holder 75 is integrally mounted on the sleeve 74 and rotates freely with respect to the rear wheel axle 18. The damper member 77 is interposed between the damper holder 75 and the rear wheel 76. In other words, the sleeve 74 is a member connecting the driven gear 49 and the damper holder 75 and transmitting drive force.

Also shown are bearings 78a-78d supporting the rear wheel axle, seal members 79a-79c, and a tightening nut 81.

The structure about the rear wheel axle allows the drive force applied to the driven gear 49
to be transmitted in order through the sleeve 74, the damper holder 75, the damper member 77 and the wheel for the rear wheel 76 in order to drive the rear wheel 19.

In the present embodiment, the rear wheel drive mechanism 41 is housed in the right swing arm 17R however may be housed in the left swing arm 17L.

Figure 4:
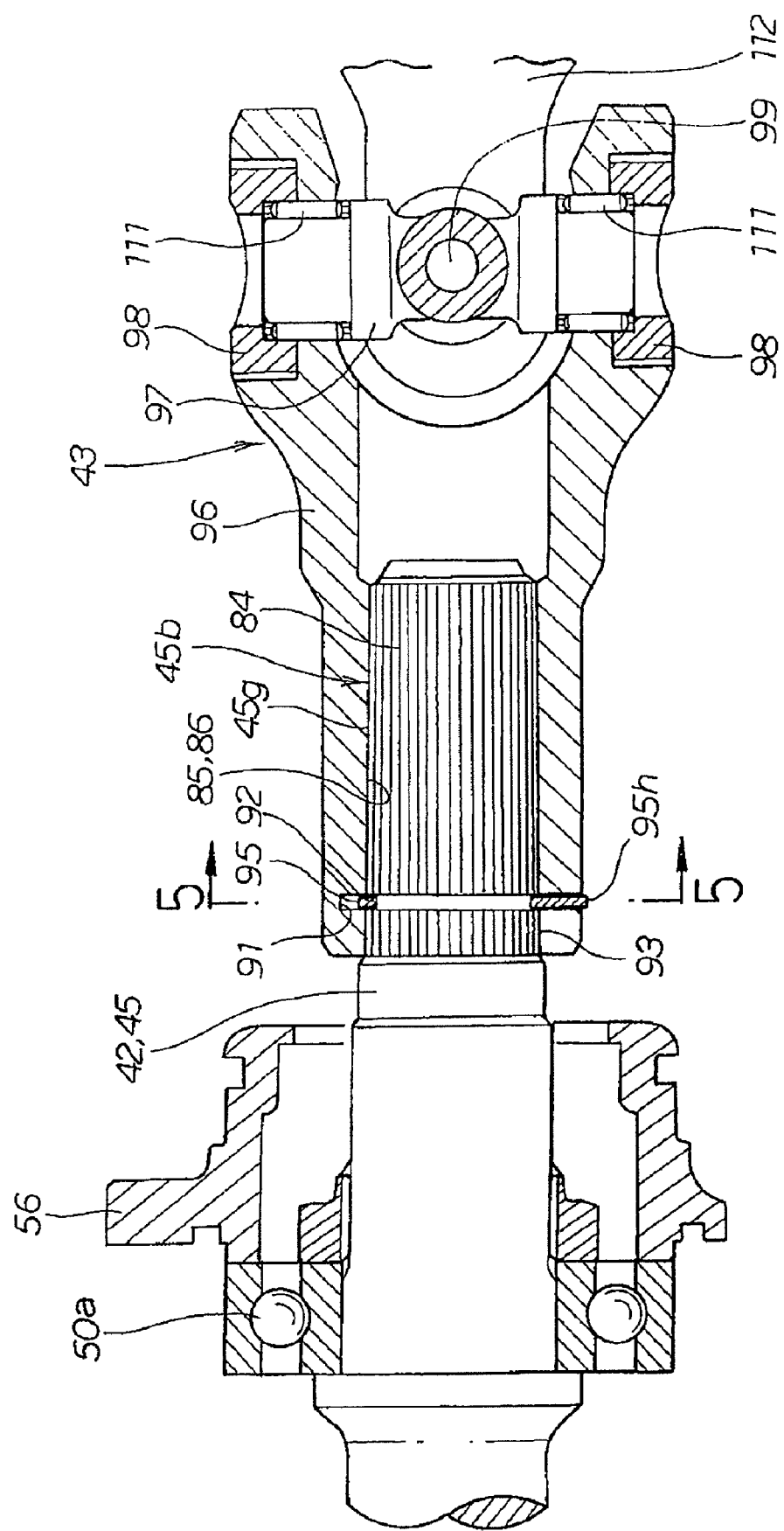
FIG. 4 is a sectional view of a connecting section for a universal joint and a drive shaft provided on a vehicle according to the present invention.

FIG. 4 is a sectional view of the connecting section of a universal joint and a drive shaft provided in a vehicle according to the present invention. A universal joint 43 is mounted on a first drive shaft 45 as an output shaft 42 for the engine.

A first drive shaft 45 acting as an output shaft 42 for the engine 15 is supported on the bearing 50a. A spline section 84 engaged with the universal joint 43 is formed on the rear end 45b of the first drive shaft 45.

The universal joint 43 is provided with a tubular engaging section 85 on the front end with respect to the longitudinal dimension of the vehicle which engages with a spline section 84. A spline hole 86 is formed on the tubular engaging section 85.

In other words, the spline hole 86 provided on the inner periphery of the tubular engaging section 85 of the universal joint 43 is engaged with the spline section 84 provided on the outer periphery 45g of the first drive shaft 45 acting as an output shaft 42.

On the inner periphery of the tubular engaging section 85, in proximity to the tip of the tubular engaging section 85, a first annular groove 91 is provided orthogonal to the axial dimension of a tubular annular section 87 and a notched section 93 has a section opening towards the tip of the tubular engaging section 85 from the first annular groove 91.

A second annular groove 92 is provided at a position corresponding to the first annular groove 91 on the spline section 84 in an axial direction.

A circular clip 95 is disposed spanning the first annular groove 91 and the second annular groove 92. The circular clip 95 has the function of preventing shift of the universal joint 43 in an axial direction relative to the output shaft 42.

The main components of the universal joint 43 are a main body 96, a first shaft 97 provided on a rear end of the main body 96, supporting sections 98, 98 supporting both ends of the first shaft 97 and a second shaft 99 provided orthogonally with respect to the first shaft 97. Bearings 111, 111, and an output section 112 are also shown.

In order to prevent shift in an axial direction, the universal joint 43 is fastened with respect to the output shaft 42 by providing a circular clip 95 spanning the first annular groove 91 and the second annular groove 92. If it is assumed that the universal joint 43 shifts in an axial direction, when the universal joint 43 has shifted, there is the possibility that noise and vibration will be produced. The present invention can increase comfort and performance when the vehicle is running by fastening the universal joint 43 to the output shaft 42. In the following figures, the first annular groove 91, the second annular groove 92 and the clip 95 will be described in further detail.

Figure 5A:
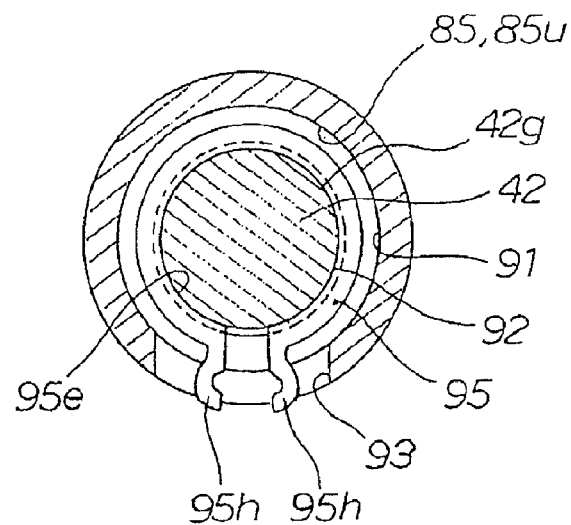
FIGS. 5(a) and 5(b) are sectional views along the line 5-5 in FIG. 4 and shows the operation thereof.

FIGS. 5(a) and (b) are sectional views along the line 5-5 in FIG. 4 showing operation characteristics.

At FIG. 5(a), a round crown-shaped clip 95 is provided spanning the first annular groove 91 and the second annular groove 92. The clip 95 is constituted by an elastic material and is provided with an operating section 95h, 95h which can be expanded by use of a tool 113. In this state, the inner wall 95e of the clip 95 abuts with the second annular groove 92.

Figure 5B:
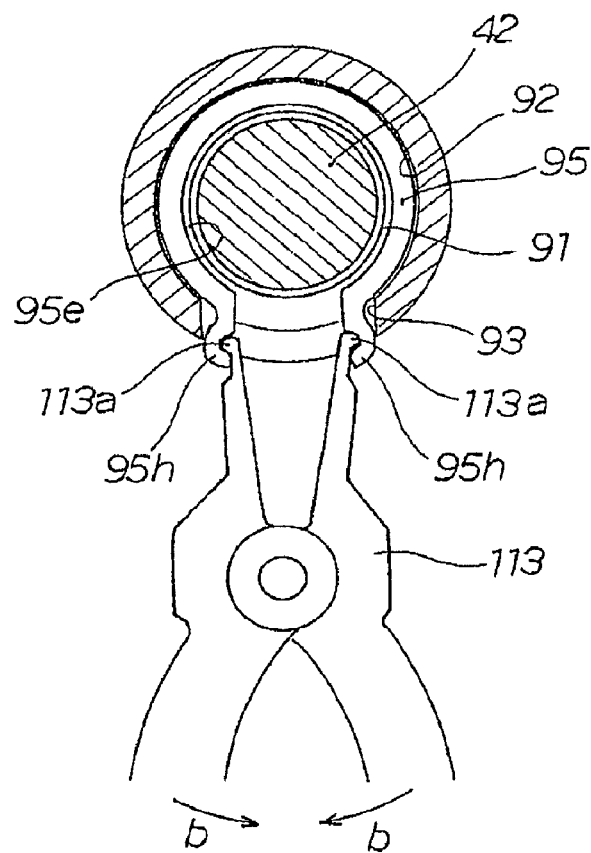

At FIG. 5(b), the tool 113 is set into the operating section, the arm of the tool 113 is operated in the direction of the arrows b, b in FIG. 5(b), and the clip 95 is expanded by expanding the tips 113a, 113a of the tool 113. In this state, the inner wall 95e of the clip 95 becomes separated from the second annular groove 92 and, at the axial cross section, the side section 95s of the clip 95 is detached from the region of the second annular groove 92 and is shifted to a region of the first annular groove 91 at the axial cross section. The clip 95 is disposed in a position allowing axial displacement. In this state, the clip 95 can be removed easily by shifting the tool 113 in an axial direction.

Referring now to FIG. 4 and FIGS. 5(a) and (b), the circular clip 95 is disposed spanning the outer periphery 42g of the output shaft 42 and the inner periphery 85u of the tubular engaging section 85. The operating sections 95h, 95h of the clip 95 face the notched section 93 provided on the tubular engaging section 85.

The notched section 93 is provided on the tip 85a of the tubular engaging section 85 and opens toward the axial dimension of the drive shaft 54. Thus a mounting or a removing operation of the clip 95 on the first annular groove 91 and the second annular groove 92 is facilitated by suitable selection of the shape and material of the clip 95.

The operation of the vehicle as described above is as follows.

Figure 6A:
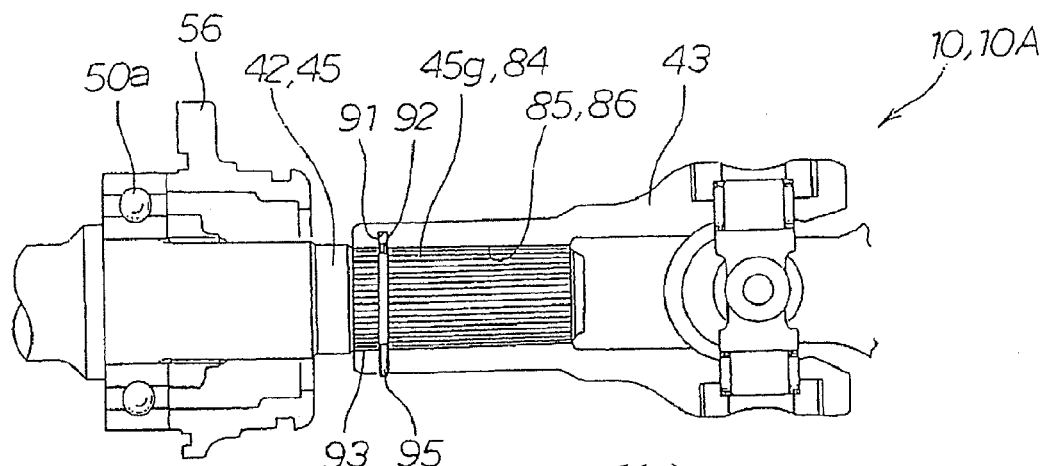
FIGS. 6(a) to 6(c) show the operation of removing the universal joint from the drive shaft.
Figure 6B:
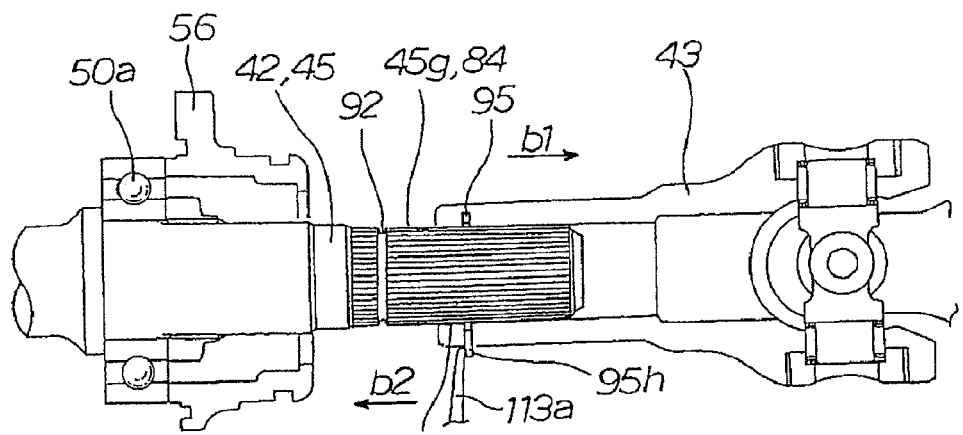
Figure 6C:
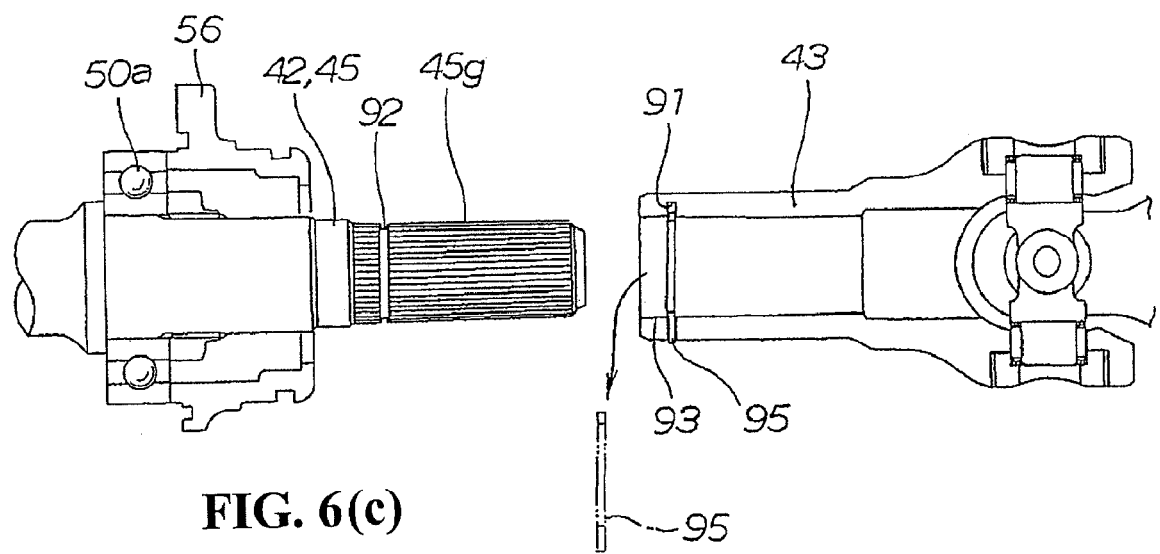

FIGS. 6(a) to (c) show the operation of removing the universal joint from the drive shaft.

At FIG. 6(a), the spline section 84 provided on the outer periphery 45g of the first drive shaft 45 and the spline hole 86 provided on the inner periphery of the tubular engaging section 85 of the universal joint 43 are engaged so that the position of the first annular groove 91 corresponds with the position of the second annular groove 92. The clip 95 is engaged spanning the first annular groove 91 and the second annular groove 92.

At FIG. 6(b), the clip 95 is expanded so as not to catch on the second annular groove 92 by expanding the tips 113a of the tool 113. The universal joint 43 is shifted in the direction of the arrow b1 in the figure and removed from the output shaft 42 by retaining the clip in an expanded state.

At FIG. 6(c), the clip 95 can be removed by shifting the clip 95 along the notched section 93.

In the past, although a structure interposing a clip between the drive shaft and the universal joint was provided, the attachment and detachment of the clip was complicated and in particular, since the clip was deformed during a detachment operation, the problem arose that the reuse of the clip was difficult.

With respect to this point, the present invention provides a notched section 93 on the joint section 115 allowing the clip 95 to be removed from the second annular groove 92 of the drive shaft 54. An operating section 95h provided on the clip 95 is adapted to face the notched section 93. This arrangement facilitates the assembly or dismantling of the clip 95 since when assembling or dismantling the joint section 115, the clip 95 is expanded and while removed from the groove of the drive shaft 54, the clip 95 can be shifted along the notched section 93 provided with respect to an axial dimension of the drive shaft 54.

An inner periphery 43u of the universal joint 43 is engaged with the outer periphery 84g of the spline section 84 and a circular clip 95 is disposed spanning the outer periphery 84g and the inner periphery 43u. Thus the position of the universal joint 43 can be maintained with respect to the axial dimension of the drive shaft 54.

The operating section 95h of the clip 95 is adapted to face the notched section 93 provided on the tubular engaging section 85. When assembling the universal joint 43 with the drive shaft 54, the operating section 95h of the clip 95 is operated, and while the clip 95 is expanded, the universal joint 43 is shifted. Thus mounting of the universal joint 43 on the drive shaft 54 can be simplified.

When removing the universal joint 43 from the drive shaft 54, the operating section 95h of the clip 95 is operated, and while the clip 95 is expanded, the universal joint 43 is shifted. Thus removal of the universal joint 43 from the drive shaft 54 can be simplified.

The notched section 93 is provided on the tip 85a of the tubular engaging section 85 and opens with respect to an axial dimension of the drive shaft 54. Thus the clip 95 can be shifted by using the notched section 93 in order to facilitate removal or assembly of the clip 95. Since the attachment or detachment of the clip 95 on the drive shaft 54 is facilitated, the attachment/detachment characteristics of the clip 95 with respect to the tubular engaging section 85 are considerably enhanced.

The present invention has been described as applied to a motorcycle in the above embodiment. However the invention can be applied to a three-wheeled vehicle or a general vehicle.

The present invention is suitable for motorcycles of a type which transmit drive power via a universal joint and a drive shaft.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A vehicle transmitting drive force from an engine to drive wheels via a universal joint and a drive shaft from an engine to drive wheels, comprising:
    a spline hole provided on an inner periphery of a tubular engaging section of the universal joint is engaged with a spline section provided on an outer periphery on one end of the drive shaft;
    a circular clip is provided spanning the outer periphery and the inner periphery; and
    an operating section for a clip faces a notched section provided on the tubular engaging section,
    wherein the operating section of the circular clip includes a pair of members with surfaces facing each other, the surfaces facing each other are concave in shape.

2. The vehicle according to claim 1, wherein the notched section is provided on a tip end of the tubular engaging section and opens towards the axial dimension of the drive shaft.

3. The vehicle according to claim 1, further comprising:
    a first annular groove is provided orthogonal to an axial dimension of a tubular annular section in proximity to a tip end of the tubular engaging section; and
    a notched section having a section opening towards the tip end of the tubular engaging section from the first annular groove.

4. The vehicle according to claim 3, wherein a second annular groove is provided on the spline section of the drive shaft corresponding to the first annular groove of the tubular engaging section.

5. The vehicle according to claim 1, wherein the circular clip is formed of an elastic material and is capable of being removed from the tubular engaging section along the notched section.

6. The vehicle according to claim 1, wherein the circular clip is capable of being expanded by a force applied to the operating section.

7. The vehicle according to claim 1, wherein the pair of members with surfaces facing each other is adapted to extend through the notched section.

8. The vehicle according to claim 1, wherein the circular clip is capable of spanning a first annular groove of the universal joint and a second annular groove of the drive shaft, in order to prevent a shift of the universal joint in an axial direction relative to the drive shaft.

9. The vehicle according to claim 1, wherein the circular clip is capable being expanded to a state in which an inner diameter thereof is larger than an outer diameter of the drive shaft, in order to allow a shift of the universal joint in an axial direction relative to the drive shaft.

10. A vehicle comprising:
    a swing arm provided to swing freely on a vehicle frame via a pivot shaft; and
    drive wheels axially supported by the swing arm and rotated by a drive shaft transmitting drive force from an engine,
    wherein: the drive shaft is connected to the output shaft of the engine by a universal joint;
    a spline hole provided on an inner periphery of a tubular engaging section of the universal joint is engaged with a spline section provided on an outer periphery of the output shaft;
    a circular clip is provided spanning the outer periphery and the inner periphery; and
    an operating section for the clip faces a notched section provided on the tubular engaging section,
    wherein the operating section of the circular clip includes a pair of members with surfaces facing each other, the surfaces facing each other are concave in shape.

11. The vehicle according to claim 10, wherein the notched section is provided on a tip end of the tubular engaging section and opens towards the axial dimension of the output shaft.

12. The vehicle according to claim 10, further comprising:
    a first annular groove is provided orthogonal to an axial dimension of a tubular annular section in proximity to the tip end of the tubular engaging section; and
    a notched section having a section opening towards the tip end of the tubular engaging section from the first annular groove.

13. The vehicle according to claim 12, wherein a second annular groove is provided on the spline section of the output shaft corresponding to the first annular groove of the tubular engaging section.

14. The vehicle according to claim 10, wherein the circular clip is formed of an elastic material and is capable of being removed from the tubular engaging section along the notched section.

15. The vehicle according to claim 10, wherein the circular clip is capable of being expanded by a force applied to the operating section.

16. The vehicle according to claim 10, wherein the pair of members with surfaces facing each other is adapted to extend through the notched section.

17. The vehicle according to claim 10, wherein the circular clip is capable of spanning a first annular groove of the universal joint and a second annular groove of the output shaft, in order to prevent a shift of the universal joint in an axial direction relative to the output shaft.

18. The vehicle according to claim 10, wherein the circular clip is capable being expanded to a state in which an inner diameter thereof is larger than an outer diameter of the output shaft, in order to allow a shift of the universal joint in an axial direction relative to the output shaft.

* * * * *